United States Patent
Clark et al.

(10) Patent No.: US 6,405,440 B1
(45) Date of Patent: Jun. 18, 2002

(54) GLASS TAPPING TOOL WITH OPTIONAL GLASS CUTTING HEAD

(76) Inventors: Robert G. Clark; Wendie R. Clark, both of 2446 Avenue Madrid Este, West Palm Beach, FL (US) 33415

( * ) Notice: Subject to any disclaimer, the term of this patent is extended or adjusted under 35 U.S.C. 154(b) by 0 days.

(21) Appl. No.: 09/654,999

(22) Filed: Aug. 31, 2000

Related U.S. Application Data

(60) Provisional application No. 60/152,503, filed on Sep. 2, 1999.

(51) Int. Cl.[7] ................................................. B25F 1/00
(52) U.S. Cl. ...................... 30/164.9; 30/164.6; 30/123.3
(58) Field of Search .............................. 30/123.3, 164.6, 30/164.9, 164.95, 366, 367; 225/94, 96, 96.5, 103

(56) References Cited

U.S. PATENT DOCUMENTS

| | | | | |
|---|---|---|---|---|
| 54,852 A | * | 5/1866 | Burnham | 30/164.6 |
| 219,313 A | | 9/1879 | Shelley | |
| 987,335 A | | 3/1911 | Godwin | |
| 1,102,843 A | * | 7/1914 | Woodward | 30/123.3 |
| 1,263,129 A | | 4/1918 | Schroeder | |
| 1,643,433 A | | 9/1927 | Walker | |
| 2,135,404 A | * | 11/1938 | Lofstrand, Sr. | 30/164.6 |
| 2,283,134 A | * | 5/1942 | Barrett | 30/123.3 |
| 2,591,828 A | | 4/1952 | Judd | 225/96.5 |
| 3,462,835 A | * | 8/1969 | Fancher | 30/164.95 |
| 3,532,260 A | | 10/1970 | Augustin et al. | 225/96.5 |
| 3,572,564 A | | 3/1971 | Fleming | 30/164.95 |
| 3,744,692 A | | 7/1973 | Doyel | 225/96 |
| 3,790,052 A | | 2/1974 | Toll | 30/164.9 |
| 3,900,058 A | | 8/1975 | McArdle | |
| 4,287,669 A | | 9/1981 | Arai | 30/123.3 |
| 4,451,981 A | | 6/1984 | Kaniarz | 30/123.3 |
| 4,571,828 A | * | 2/1986 | Miffitt | 30/123.3 |
| 4,595,132 A | | 6/1986 | Abel | 225/96.5 |
| 4,726,500 A | | 2/1988 | Rock | 225/96.5 |
| 4,878,260 A | | 11/1989 | Tunningley et al. | 7/129 |
| 5,657,543 A | | 8/1997 | Collins | 30/367 |
| 5,791,056 A | | 8/1998 | Messina | 30/367 |
| 6,009,626 A | * | 1/2000 | Lei | 30/164.6 |

* cited by examiner

*Primary Examiner*—Hwei-Slu Payer
(74) *Attorney, Agent, or Firm*—Jon A. Gibbons; Fleit, Kain, Gibbons, Gutman & Bongini P.L.

(57) ABSTRACT

A glass tapping tool for tapping glass and breaking glass along a score-line that has been previously cut. In one embodiment, the tool comprises a hollow tube with a first end and a second end. A stationary striking member is attached to the first end of the tube for tapping a piece of glass which has been previously cut along a score-line. Mounted inside the tube is a slidable hammer with a first end and a second end. The slidable hammer is mounted so that the second end of the slidable hammer protrudes outside the second end of the hollow tube. Elastically coupled the stationary striking member with the slidable hammer is a spring. When a user pulls the part of slidable hammer protruding from the hollow tube in an axial direction away from the hollow tube, the spring produces a force in opposite direction which causes the slidable hammer through the spring to strike the stationary striking member, when the user releases the slidable hammer, so as to tap the glass along a score line and causing the glass to break along the score line.

16 Claims, 10 Drawing Sheets

GLASS TAPPING TOOL WITH OPTIONAL GLASS CUTTING HEAD

CROSS-REFERENCE TO RELATED APPLICATIONS

This non-provisional application is based on the provisional patent application serial No. 60/152,503 to Robert Clark, for "SPRING LOADED GLASS CUTTING TOOL" filed Sep. 2, 1999, which is hereby incorporated by reference in its entirety.

BACKGROUND OF THE INVENTION

1. Field of the Invention

The invention disclosed broadly relates to the field of glass cutting and more particularly for hand tools used to break glass that has been previously cut with a glass cutter.

2. Description of the Related Art

Cutting glass and glass type products has always been challenging. Many tools have been developed to cut glass such as general purpose glass cutters. As an example, the Fletcher brand hand glass cutters that are available from C.R. Laurence Co. of Orlando, Fla. or Anything in Stained Glass of Rio Grande, N.J. (http://www.anythinginstainedglass.com/tools/toolfrm.htm). Shown in FIG. 1 is an example of a prior art hand glass cutter 100 such as the Fletcher "Steel Wheel Cutter." The steel wheel cutter 100 has a cutting wheel 102 on one end with a ball tapping handle on the other end 104. A solid shaft 106 made of metal such as brass and optional breaking grip 108 is shown. And although these hand glass cutters are useful, they are not without their shortcomings.

One shortcoming is these tools do not work well when cutting small pieces of glass that are typically less than 1 inch in width. Accordingly, a need exists for a glass breaking and cutting tool to overcome this problem.

Another shortcoming is these hand glass cutters do not work well for long glass cuts. Long glass cuts require several taps of uniform pressure and the current hand glass cutters do not permit control of the pressure. Accordingly, need exists for a glass breaking and cutting tool to overcome this problem and provide a taping mechanism that applies uniform pressure over the area previously scored.

Another shortcoming is these hand glass cutters do not work well when laminated glass, such as bullet-proof glass, because the force of the taping cannot be accurately controlled. Therefore, need exists for a glass cutting tool and breaking tool to overcome this problem.

Other prior art glass cutters separate the cutting head 102 from the tapping head 104, such as the Fletcher brand Pistol Grip Oil Cutter (not shown). These prior art glass cutters use two hand glass cutters. One tool is used to score or cut the glass and a second tool is used to tap the glass in order to break the glass along the score. The requirement of switching hand glass cutters is cumbersome. Accordingly, a need exists for a tool that permits cutting and breaking the glass in one tool.

SUMMARY OF THE INVENTION

Briefly, in accordance with the invention, disclosed is a glass tapping tool for tapping glass and breaking glass along a score-line that has been previously cut. In one embodiment, the tool comprises a hollow tube with a first end and a second end. A stationary striking member is attached to the first end of the tube for tapping a piece of glass which has been previously cut along a score-line. Mounted inside the tube is a slidable hammer with a first end and a second end. The slidable hammer is mounted so that the second end of the slidable hammer protrudes outside the second end of the hollow tube. Elastically coupled between the stationary striking member and the slidable hammer is a spring. When a user pulls the part of slidable hammer protruding from the hollow tube in an axial direction away from the hollow tube, the spring produces a force in opposite direction which causes the slidable hammer through the spring to strike the stationary striking member, when the user releases the slidable hammer, so as to tap the glass along a score line and causing the glass to break along the score line.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF AN EMBODIMENT(S)

It is important to note that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

Overview of the First Embodiment (Non-Integral Tapping Head)

Figure 1:
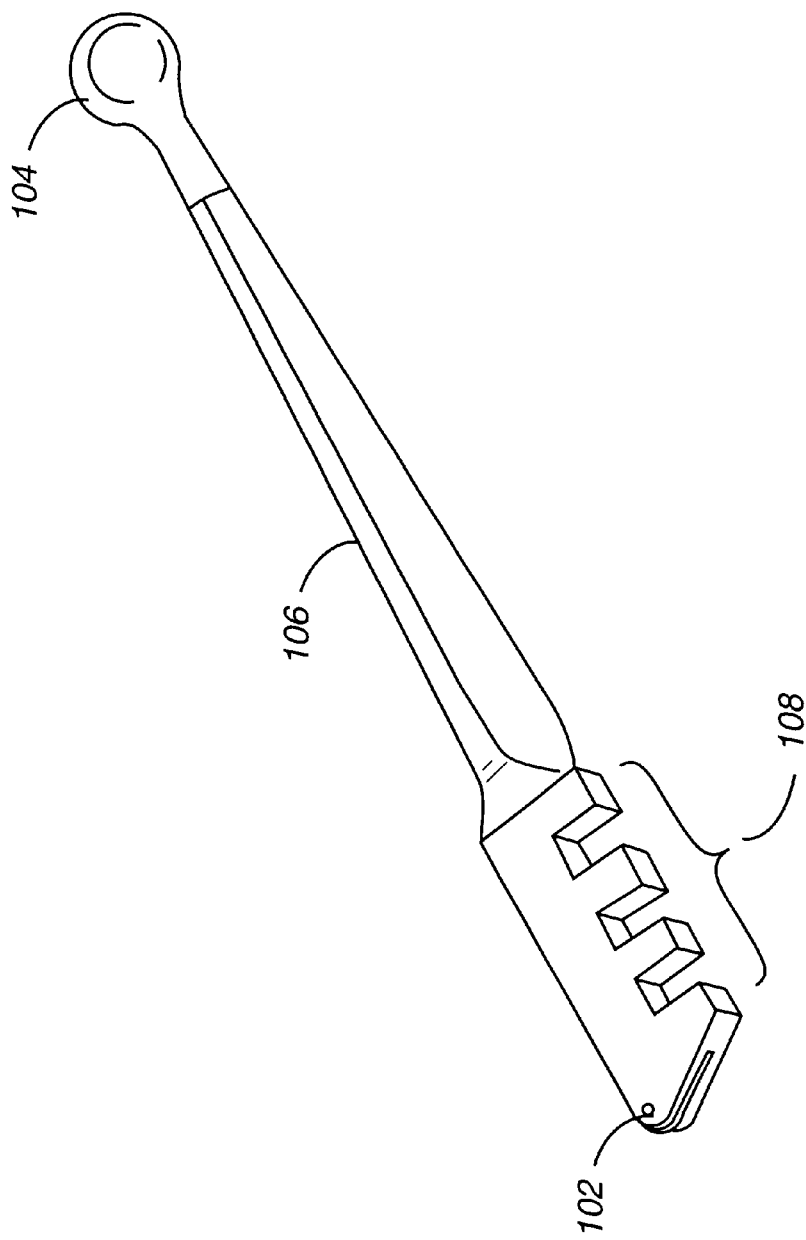
FIG. 1 is an elevational view of a prior art glass cutting tool.
Figure 2:
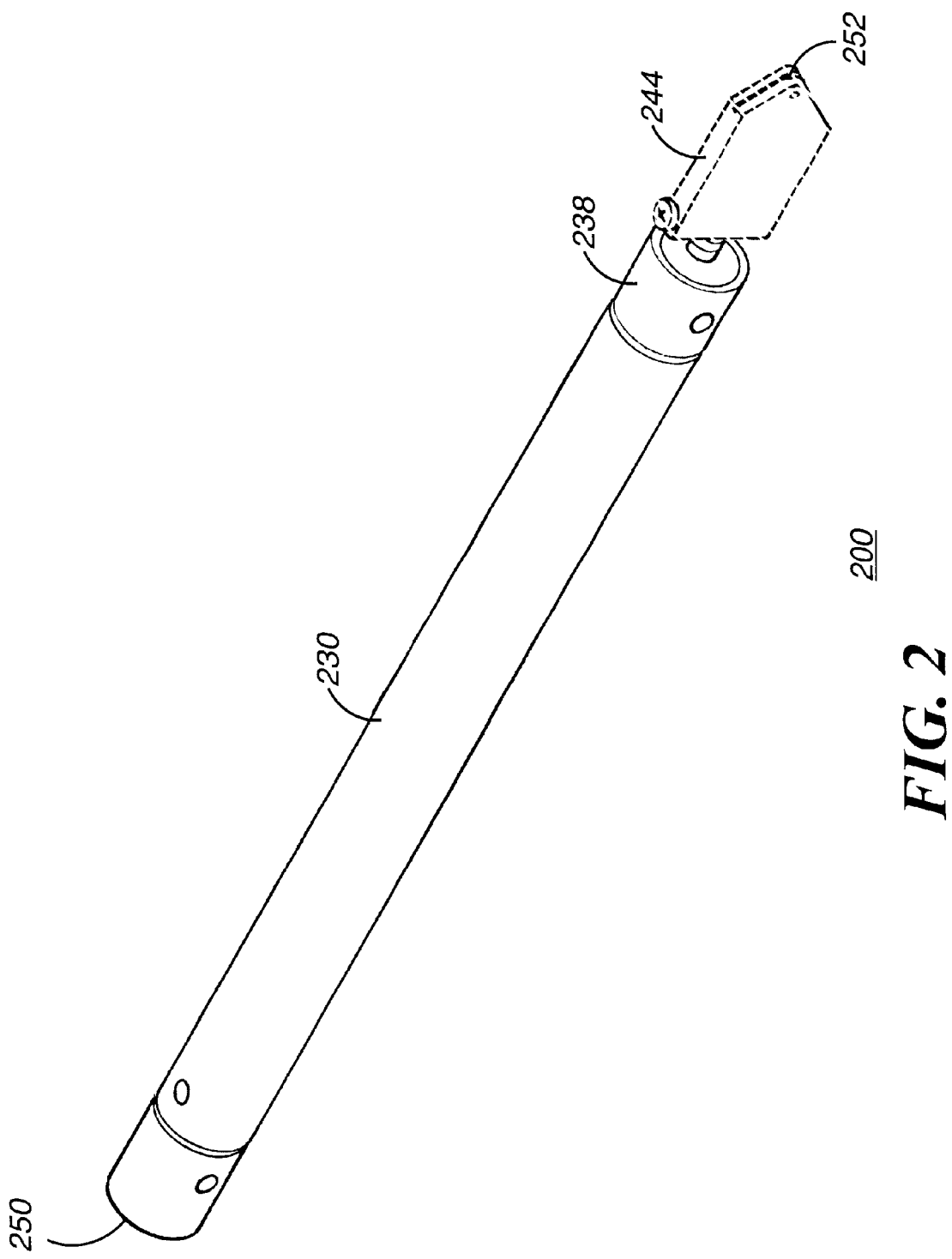
FIG. 2 is an elevational view of a first embodiment of a glass tapping tool with optional glass cutting head, according to the present invention.

Referring now in more detail to the drawings in which like numerals refer to like parts throughout several views, FIG. 2 is an elevational view of the glass tapping tool with optional glass cutting head 200, according to the present invention. The glass tapping tool with optional glass cutting head 200 has two ends, a breaker end 250 and a cutter end 252. A grasping tube 230 is any hollow tube, such as ½ inch diameter aluminum tubing cut in 6 inch long sections. A collet 238 rests between the cutter end 252 and the grasping tube 230.

Description of Components of the First Embodiment (Non-Integral Tapping Head)

Figure 3:
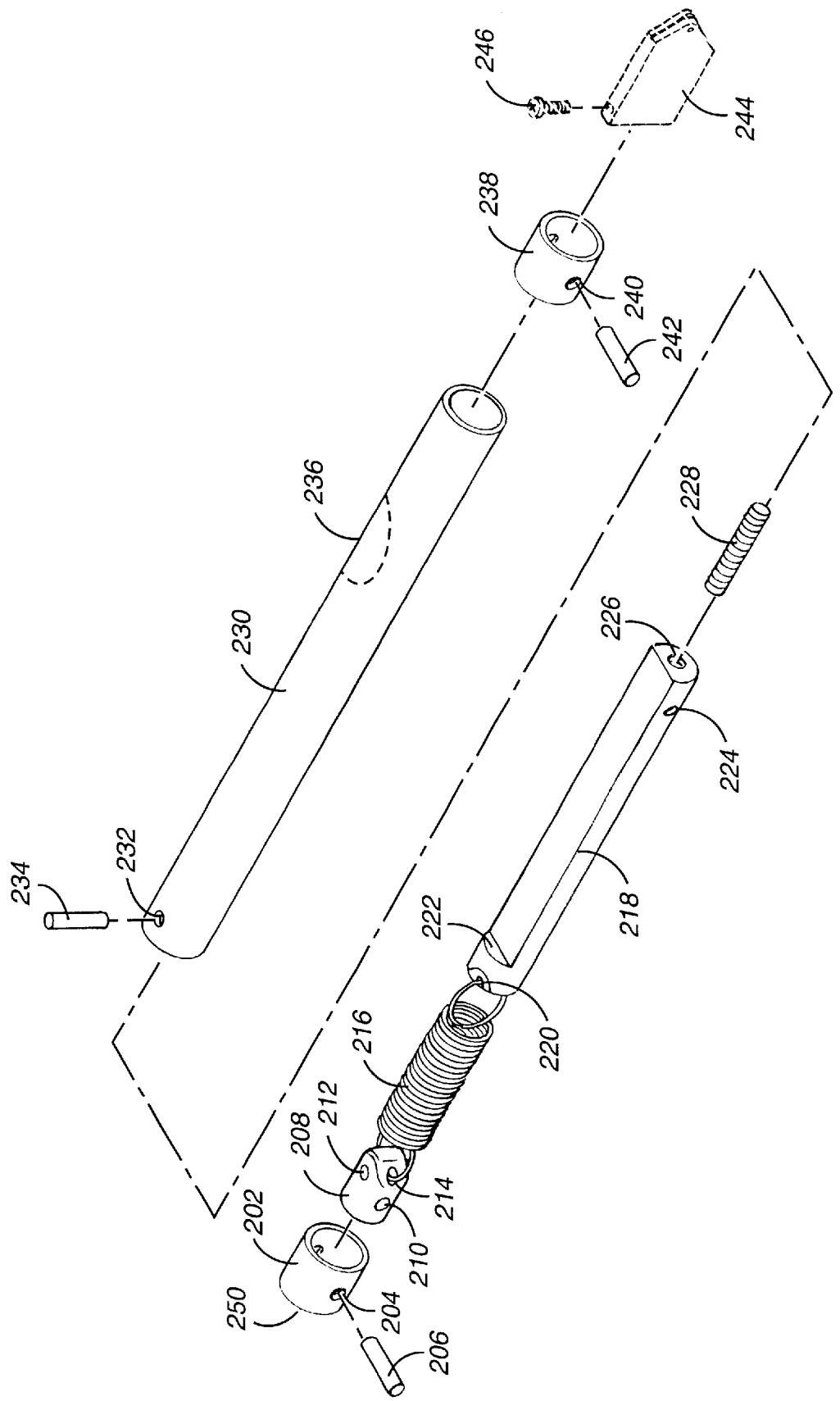
FIG. 3 is an explosion view of the first embodiment of the glass tapping tool with optional glass cutting head of FIG. 2, according to the present invention.

FIG. 3 is an explosion view of the glass tapping tool 200 with optional glass cutting head of FIG. 2, according to the present invention. The breaker end 250 in one embodiment is formed from a metal cap 202 and solid shaft 208. An opening 204 in cap 202 allows pin 206 to join the shaft 208 with opening 210 together. Although the breaker end globally 250 is two pieces in this embodiment, it is possible to construct the breaker end out of one piece such as a die-cast piece. The breaker end 250 and the solid shaft 208 are made out of any metal, such as aluminum, and are what is used to break the glass as will be described further below. The length of the solid shaft 208 is about 1 inch and is dimensioned so that it can fit inside grasping tube 230. The solid shaft 208 has an opening 214 in one end joining the spring 216. A slidable hammer piece 218 has an opening 220 for receiving a second end of spring 216. The slidable hammer piece 218 has a chamfer 222 for limiting the travel of the slidable hammer piece 218 out of the grasping tube 230 during use. A stop 236 is disposed in the grasping tube 230 near the cutter end 252 which engages the chamfer 222. The stop 236 cane an indentation formed in the tube or some material such as adhesive disposed inside the grasping tube 230. The slidable hammer 218 has an opening 226 for receiving pin 228. In this embodiment the pin is a ⅛ inch by ¾ inch steel pin. The assembly thus far is placed inside the grasp tube 230 and the solid shaft 208 of breaker end 250 is fixed to the grasping tube 230 by inserting pin 234 through opening 232 and through opening 212 of solid shaft 208. Next a collet 238 with opening 240 is joined to by a pin 242 though opening 224 of slidable hammer 218. A glass cutting head 244 is attached to pin 228 with set screw 246. The glass cutting head 244 is any cutting head such as a self-oiling or dry cutting head available from C.R. Laurence Co. Inc. of Orlando, Fla.

It should be understood that the dimensions of the components described above can be changed for thicker glass or thinner glass. As an example, industrial glass cutting applications may use a ¾ inch diameter tube that is 14 inches long, whereas an application for stained glass, a ⅜ inch diameter tube that is 4 inched long is employed. In addition, the force of the spring 216 or the spring constant can be adjusted for different applications.

Description of Use of the First Embodiment (Non-Integral Tapping Head)

Figure 4:
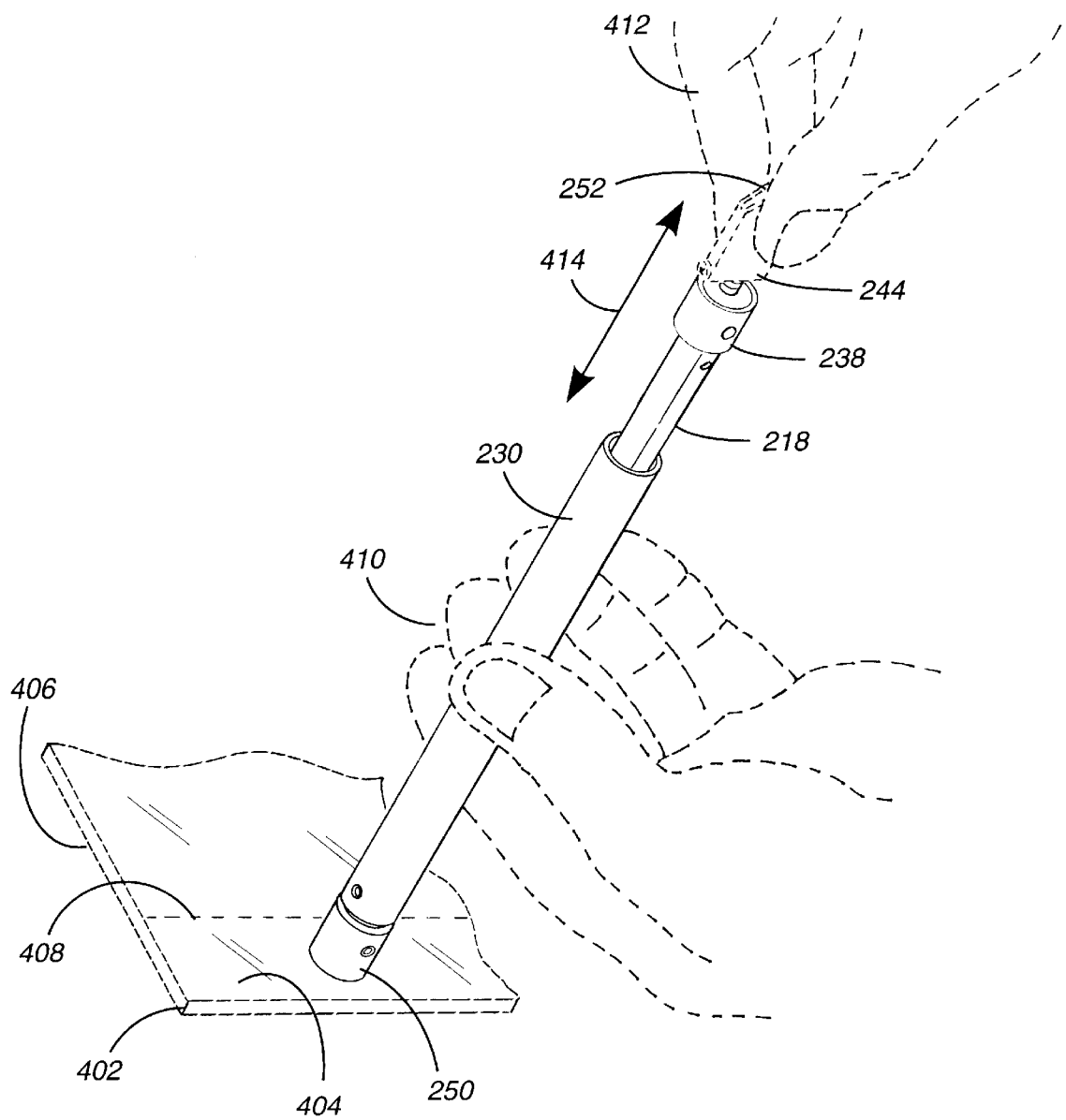
FIG. 4 is an elevational view of the first embodiment of the glass tapping tool with optional glass cutting head of FIG. 2 with a shaft extended prior to breaking a scored piece of glass, according to the present invention.

FIG. 4 is an elevational view of the glass tapping tool 200 with optional glass cutting head of FIG. 2 with a shaft extended prior to breaking a scored piece of glass, according to the present invention. A piece of glass material 402 with a first side 404 and a second side 406. A score 408 on the glass material 402 is made with the glass cutting head 244. The user flips over the breaking tool 200 so that the breaker end 250 rests against the surface of glass material 402.

In step 1, using one hand 410 the user grasps the grasp tube 230 and with the other hand 412 the user pulls the glass cutting head 244 away from the grasping tube 230 as shown by action 414 which stretches spring 216. The user is able to pull the glass cutting head 244 along with the collet 238 and a section of the slidable hammer 218 part way out of the grasping tube 230 as shown. The length of travel of the slidable hammer 218 is limited by the chamfer 222 and the stop 236. In one embodiment (not shown), the stop 236 is adjustable by moving up or down the grasping tube 230. One type of movable stop 236 is a pin that is inserted into one of a series of predefined holes along the grasping tube 230 (not shown). Adjusting the stop 236, limits the length of travel the slidable hammer 218 is able to pull out of the grasping tube 230. By limiting the distance of travel of the slidable hammer 218, permits the snap back action to be regulated to accommodate different thicknesses and types of glass.

In step 3, the user releases the glass cutting head 244 with hand 412. The spring 216 which has been distended in step 1, snaps the slidable hammer 218 back into the grasp tube 230 and the slidable hammer 218 along with the spring 216 slam against the breaking end 250 producing a fast impulse. The glass surface 402 is broken off along score-line 408. Depending on the length of the score 408 and the thickness of the glass material 402, the user may need to move the glass tapping tool with optional glass cutting head 244 down the length of the score-line 408 and repeat steps 1 and 2 as needed to break the glass 402 off along the score-line 408.

Overview of the Second Embodiment (Integral Tapping Head)

Figure 5:
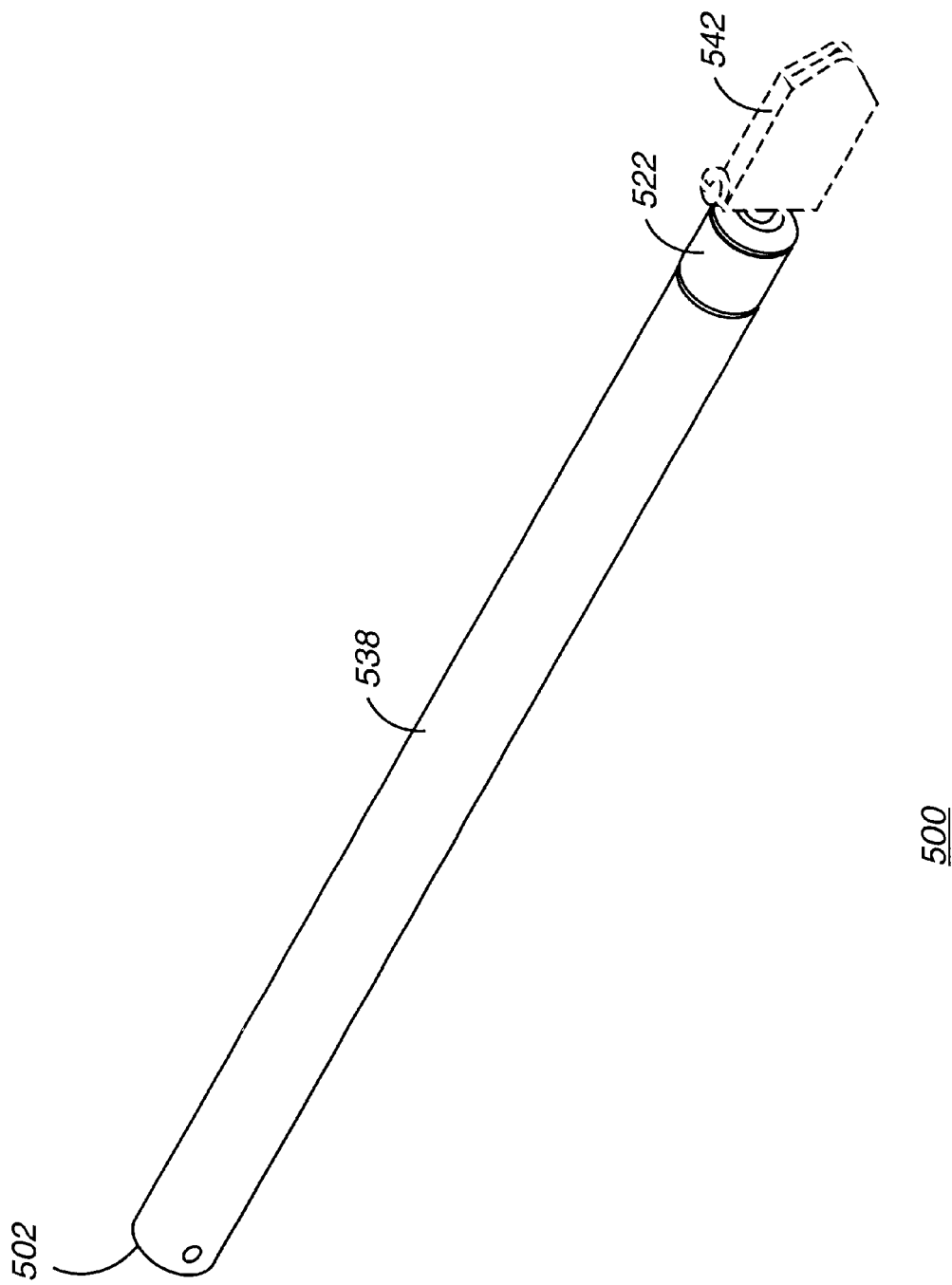
FIG. 5 is an elevational view of a second embodiment of the glass tapping tool of FIG. 2 with an integral breaking head, according to the present invention.

FIG. 5 is an elevational view 500 of another embodiment the glass tapping tool of FIG. 2 with an integral breaking head, according to the present invention. As was described above for FIG. 2, the glass tapping tool with optional glass cutting head 542 in this second embodiment has two ends, a breaker end 502 and a glass cutting head 542. A grasping tube 538 is any hollow tube, such as ½ inch diameter aluminum tubing cut in 6 inch long sections. A collet 522 rests between the glass cutting head 542 and the grasping tube 538. The differences between first embodiment and the present embodiment are quickly understood when looking at the explosion view of FIG. 6 described below as compared with the explosion view FIG. 3.

Description of Components of the Second Embodiment (Integral Tapping Head)

Figure 6:
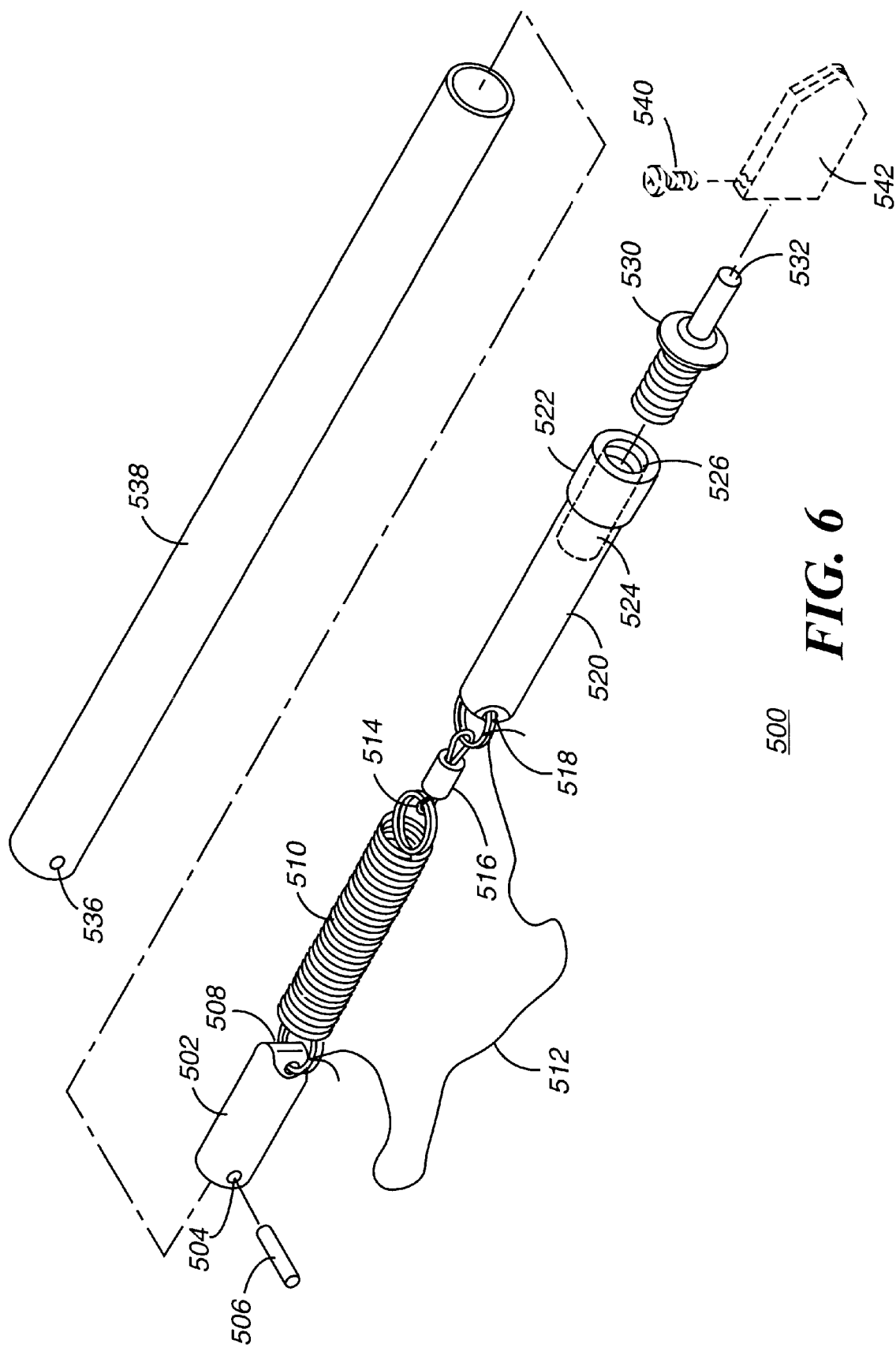
FIG. 6 is an explosion view of the second embodiment the glass tapping tool with an integral breaking head of FIG. 5, according to the present invention.

FIG. 6 is an explosion view of the glass tapping tool 500 with an integral breaking head of FIG. 5, according to the present invention. The breaker end 502 in one embodiment is formed from a solid member 502 with an opening 504 for accepting pin 506 there-through. The solid member 502 includes a second opening 508 for attaching to a spring 510. The spring is attached with a coupling member 516 such as eyelet as shown. A safety wire 512 of suitable strength, such as 20–25 lbs. test fishing line acts as a safety should the spring fail or snap during operation. The safety thread 512 keeps the solid member 502 from flying apart from the slidable hammer piece 520. The coupling member 516 attached to be an opening 518 in a first end of the slidable hammer piece 520. The other end 522 of the slidable hammer 520 forms a hollow inner area 524 with a threaded inner surface 526. A cap 530 with threads 528 formed on one end for fastening into the threaded inner surface 526 of slidable hammer 520. The cap 530 when threaded into threaded inner surface 526 of slidable hammer forms an enclosed area 524 for holding optional cutting lubricant, such as oil. The other end of the cap 530 has a tube 532 which allow the optional lubricant to flow to the glass cutting head 542 when the glass tapping tool 500 is held in cutting position with the cap 530 being above the glass cutting head 542.

Next, with the exception of pin 506, components 502 through 532 are placed in the grasping tube 538 as shown through the end without the opening 536. The opening 504 of solid member 502 is aligned with opening 536 and the pin 506 is inserted to pin the solid member 502 to grasping tube 538. A glass cutting head 542 is attached to tube 532 with set screw 540. The glass cutting head 542 is any cutting head such as a self-oiling or dry cutting head available from C.R. Laurence Co. Inc. of Orlando, Fla.

Description of Use of the Second Embodiment (Integral Tapping Head)

Figure 7:
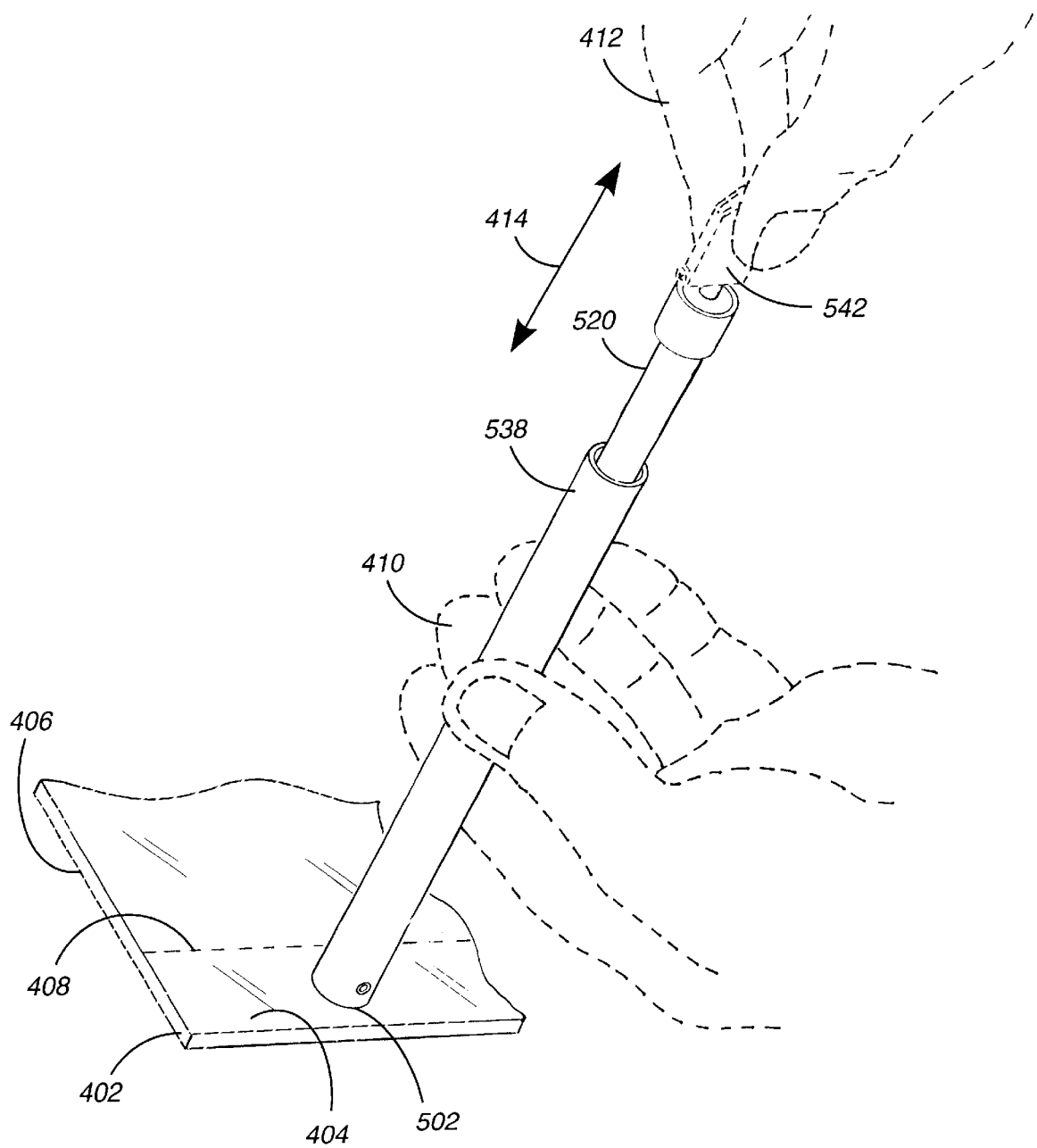
FIG. 7 is an elevational view of the second embodiment the glass tapping tool with an integral breaking head of FIG. 5 with a shaft extended prior to breaking a scored piece of glass, according to the present invention.

FIG. 7 is an elevational view of the glass tapping tool 500 with an integral breaking head of FIG. 5 with a shaft extended prior to breaking a scored piece of glass, according to the present invention. As described in FIG. 4 above, a glass material 402 is scored along score-line 408 using the glass cutting head 542. The user flips over the breaking tool 500 so that the breaker end 502 rests against the surface of glass material 402.

In step 1, using one hand 410 the user grasps the grasp tube 538 and with the other hand 412 the user pulls the glass cutting head 542 away from the grasping tube 538 as shown by action 414 which stretches spring 510. The user is able to pull the glass cutting head 542 along with the cap 530 and a section of the slidable hammer 520 part way out of the grasping tube 538 as shown. The length of travel of the slidable hammer 520 is limited by the spring 510. (And in case where the spring should fail or snap, by the safety wire 512.) This length of travel can be adjusted by changing the spring 510 or by the distance the glass cutting head 542 travels along direction 414.

In step 3, the user releases glass cutting head 542 with hand 412. The spring 510 which has been distended in step 1, snaps the slidable hammer 520 back into the grasp tube 538 and the slidable hammer 520 along with the spring 510 slam against the solid member 502 producing a fast impulse. The glass surface 402 is broken off along score-line 408. And as described above in FIG. 4, depending on the length of the score 408 and the thickness of the glass material 402, the user may need to move the glass tapping tool with optional glass cutting head 542 down the length of the score-line 408 and repeat steps 1 and 2 as needed to break the glass 402 off along the score-line 408.

Optional Glass Thickness Setting

Figure 8:
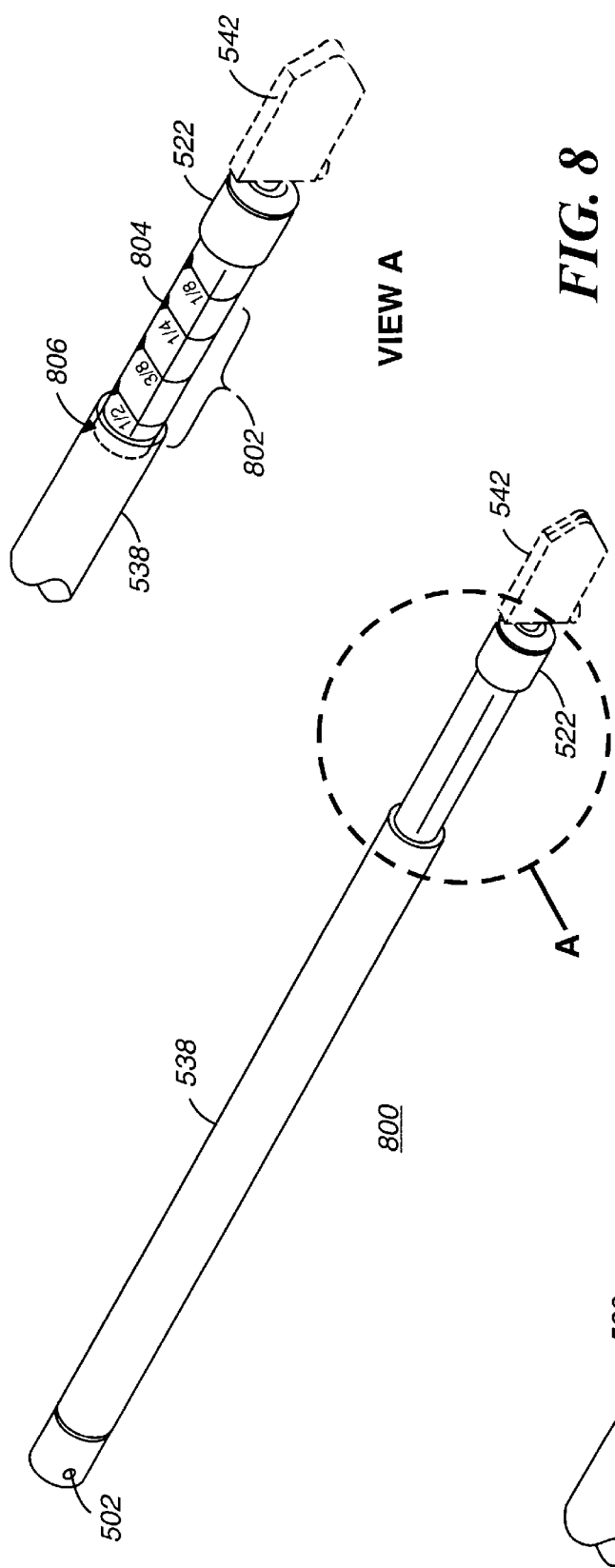
FIG. 8 is an explosion view of the glass tapping tool of FIGS. 2 and 5 illustrating another embodiment for adjusting the tapping force for a specific glass thickness, according to the present invention.

FIG. 8 is an explosion view 800 of the glass tapping tool of FIGS. 2 and 5 illustrating another embodiment for adjusting the tapping force for specific a glass thickness, according to the present invention. Shown is the slidable hammer piece 520 with a series 802 of notches 804 at with thickness labels ⅛, ¼, ⅜ ½ as shown. A paw 806 formed in the interior of the grasping tube 538 is used to engage one of the notches 804 to set the striking force exerted by the spring 510. The series of thickness labels shown ⅛, ¼, ⅜ ½ correspond to the thickness of glass the force provided by the spring is set to strike.

Safety Stop

Figure 9:
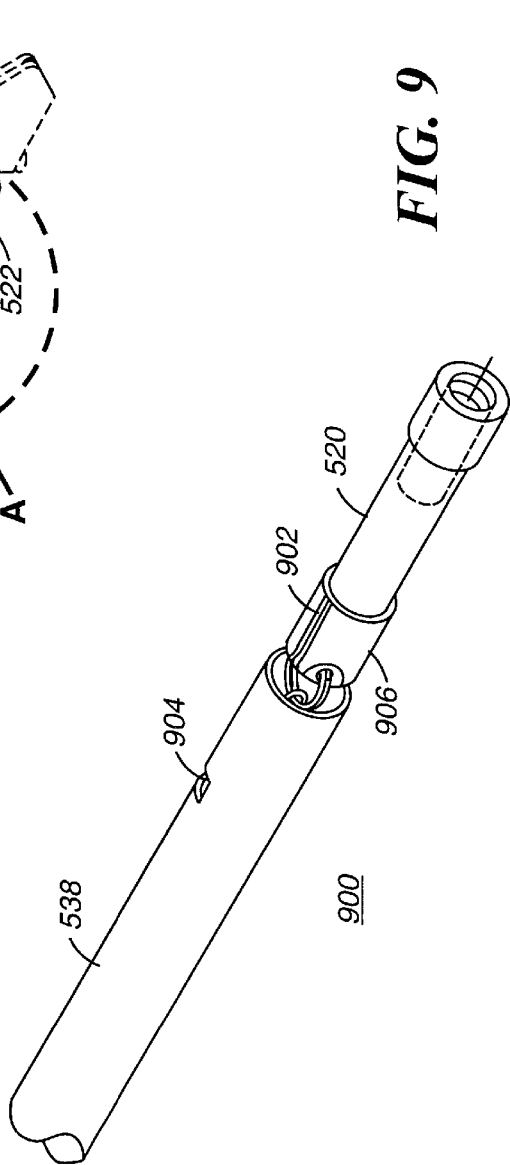
FIG. 9 is another embodiment of the glass tapping tool of FIGS. 2 and 5 illustrating a safety stop that eliminates the need for the safety wire of FIG. 6, according to the present invention.

FIG. 9 is another embodiment 900, of the glass tapping tool of FIGS. 2 and 5 illustrating a safety stop that eliminates the need for the safety wire or line thread of FIG. 6, according to the present invention. In this embodiment, the slidable hammer 520 has an annular ring 906 which dimensioned so as to fit inside the grasping tube 538. The annular ring has a notch 902 formed along it as shown. The grasping tube 538 has a crimp 904 formed therein. The size of the annular ring 906 is such that it will not pass by the crimp or safety stop 904. However, when the notch in the slidable hammer 520 is aligned with the safety notch 902, the slidable hammer can be inserted during assembly into grasping tube 538. Also the slidable hammer can be removed from the grasping tube for any maintenance of the spring 510. The combination of the annular ring 906, and the safety stop 904, eliminates the need for the safety wire 512, and the coupling member 516. The reduction in one or more of these components reduces the manufacturing costs. In addition, the use of the safety notch in the annular ring can be formed using NC (numeric control) tooling such as milling machines which also reduces the manufacturing costs.

Pistol Grip

Figure 10:
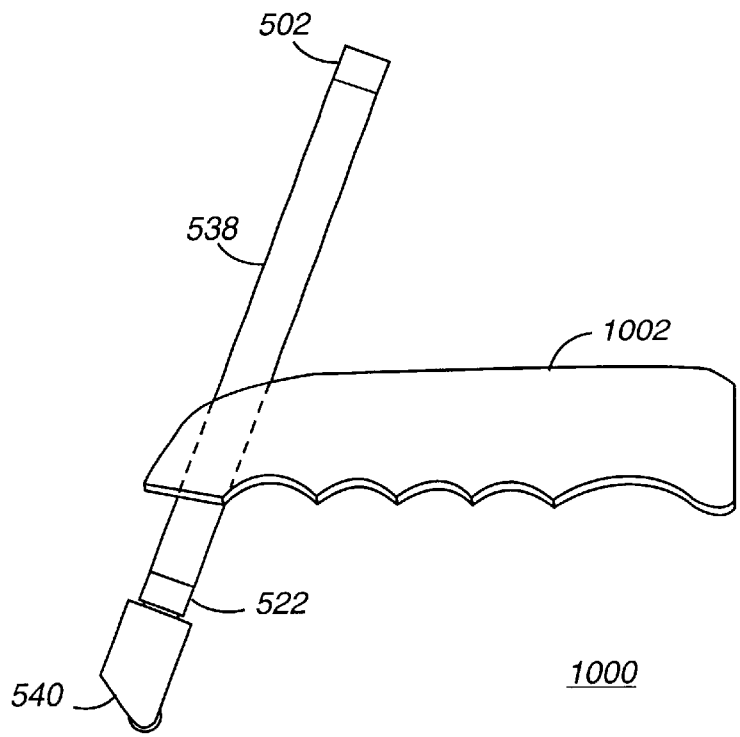
FIG. 10 is another embodiment of the glass tapping tool of FIGS. 2 and 5, illustrating an ergonomical pistol grip handle, according to the present invention.

FIG. 10 is another embodiment 1000 of the glass tapping tool of FIGS. 2 and 5, illustrating an ergonomical pistol grip handle 1002, according to the present invention. In one embodiment, the pistol grip 1002 is manufactured from molded plastic or metal and is formed to fit comfortably in one hand. The pistol grip can be formed directly as part of the grasping tube 538 or in another embodiment mounted onto the graphing tube using a clamp (not shown). The pistol grip is useful for additional ergonomic control and comfort. The pistol grip is useful for added pressure during thick glass cutting, such as ½ inch glass and is also useful for fine control such as the cutting and breaking of stained glass.

Striker Caps

Figure 11:
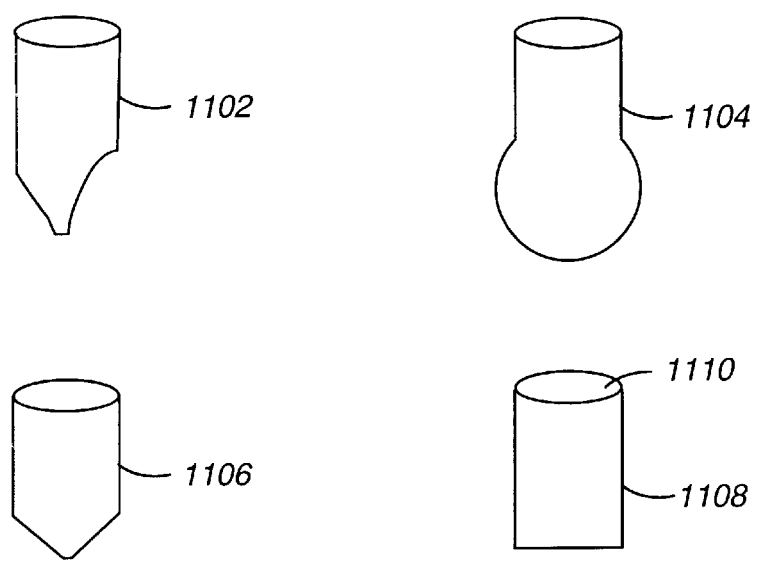
FIG. 11 is an elevational view of various optional striker caps that may be attached to the striker ends of the glass tapping tool of FIGS. 2 and 5, according to the present invention.

FIG. 11 is an elevational view 1100 of various optional striker caps that may be attached to the striker ends of the glass tapping tool of FIGS. 2 and 5, according to the present invention. Four striker caps are shown. A chisel-shaped bottom 1102, a ball-shaped bottom 1104, a pointed-shaped bottom 1106, and a flat-shaped bottom 1108. In one embodiment, each of the optional striker caps 1102, 1104, 1106, and 1108 have threaded inner diameter walls 1110 for engaging a threaded outer surface (not shown) of end cap 502. Using these optional end-caps, a user can choose the correct striker tip for the particular application. For example, for thick glass, the chisel-shaped bottom 1102 may be more effective, where the flat-shaped bottom 1108 or ball-shaped bottom 1104 is more effective for thinner glass.

Foldable Handle

Figure 12:
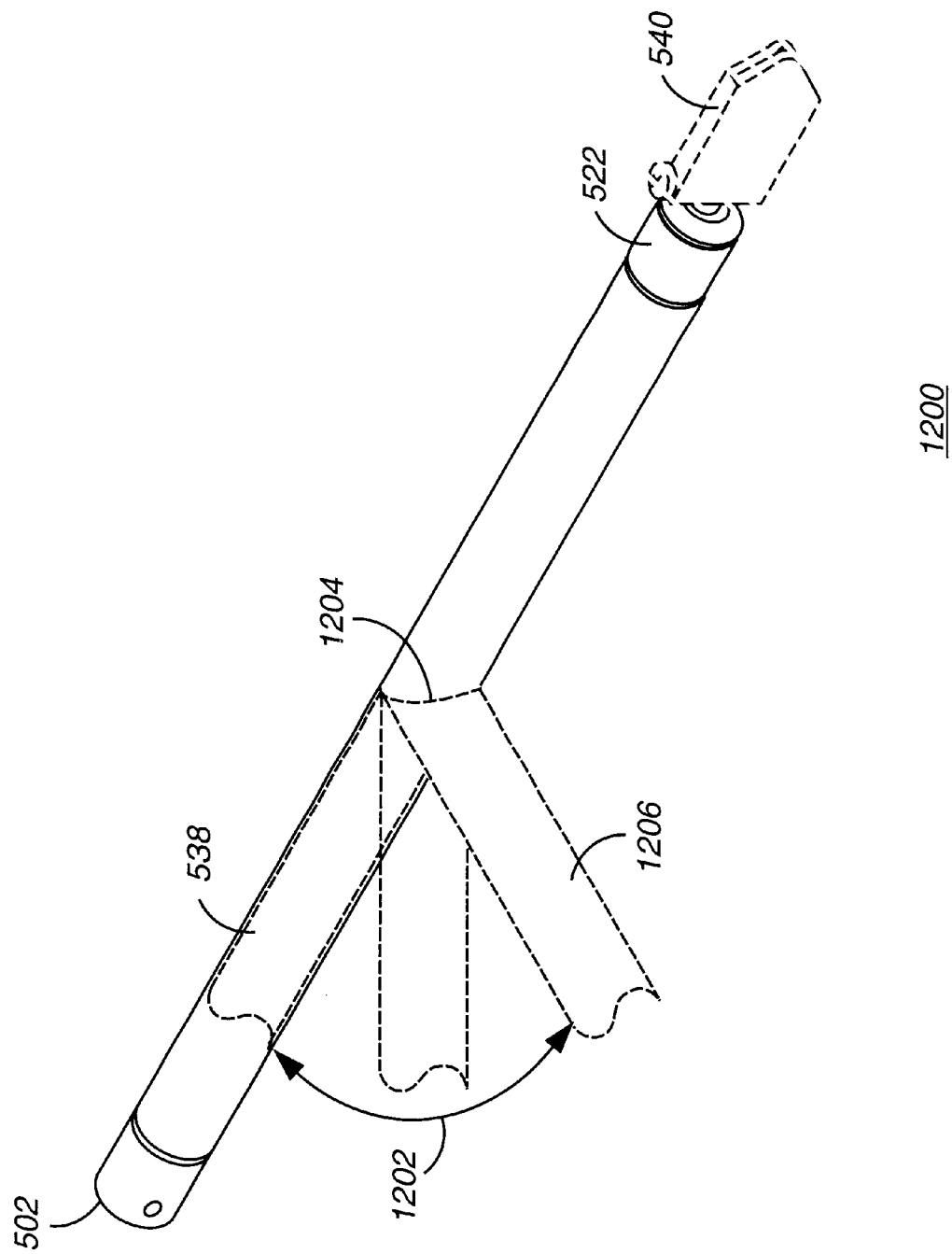
FIG. 12 is another embodiment of the glass tapping tool of FIGS. 2 and 5, illustrating a foldable handle, according to the present invention.

FIG. 12 is an another embodiment 1200 of the glass tapping tool of FIGS. 2 and 5, illustrating a foldable handle 1206, according to the present invention. The foldable handle 1206 pivots along mount 1204 to an approximately 90-degree position with respect to the grasping tube. In the closed position, the foldable handle 1206, collapse against the grasping tube 538. Using the optional folding handle 1206, a user can exert higher pressure with a palm of their hand on the handle 1206, to place higher pressure against the glass surface during the slamming process. This is particular useful for both thicker glass breaking and control glass breaking during fine work.

Terms Used Are Not Limiting

The term "glass" is used to describe any hard, amorphous, inorganic, brittle substance, usually made from fusing silicate, sometimes borates and phosphates, with certain basic oxides and then rapidly cooling to prevent crystallization. Glass includes window glass, stained-glass, mirrors, ceramic tiles and other substances usually cut with a steel wheel or a diamond point. Glass also includes safety-glass, bulletproof glass, Plexiglas™, and plastics.

The term "spring" is used to describe any elastic device such as a coil, spring, elastic, whether made from rubber, metal, ceramic, composite, plastic, that returns to an original shape after being stretched.

The components, including grasping tube, cap, solid shaft, solid member, slidable hammer, and other components shown in FIGS. 2–7, can be made in any material including metals such as aluminum and brass, but also nonmetallic components such as plastic, rubber, composite, and ceramic are within the true scope and spirit of the present invention.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A glass tapping tool for tapping glass along a score-line that has been previously cut into the glass comprising:
   a hollow tube with a first end and a second end;
   a stationary striking member attached to the first end of the tube for striking a piece of glass which has been previously cut along a score-line;
   a cap with a mount for holding a glass cutting head, the mount having a bore therethrough;
   a slidable hammer with a first end and a second end, slidably mounted inside the tube so that the second end of the slidable hammer protrudes outside the second end of the hollow tube, the second end of the slidable hammer having an axial bore for receiving the cap so as to create an enclosed internal cavity which is in communication through the bore with the glass cutting head; and
   an elastic member means for elastically coupling the stationary striking member with the slidable hammer so when a user pulls the part of the slidable hammer protruding from the hollow tube in an axial direction away from the hollow tube, the elastic member means produces a force in opposite direction which causes the slidable hammer through the elastic member means to strike the stationary striking member, when the user releases the slidable hammer, so as to tap the glass along a score line and causing the glass to break along the score line.

2. The glass tapping tool for tapping glass along a score-line that has been previously cut into the glass comprising:
   a hollow tube with a first end and a second end;
   a stationary striking member attached to the first end of the tube for tapping a piece of glass which has been previously cut along a score-line;
   a slidable hammer with a first end and a second end, slidably mounted inside the tube so that the second end of the slidable hammer protrudes outside the second end of the hollow tube; and
   a spring for elastically coupling the stationary striking member with the slidable hammer so when a user pulls the part of the slidable hammer protruding from the hollow tube in an axial direction away from the hollow tube, the spring produces a force in opposite direction which causes the slidable hammer through the spring to strike the stationary striking member, when the user releases the slidable hammer, so as to tap the glass along a score line and causing the glass to break along the score line.

3. The glass tapping tool according to claim 2, wherein the slidable hammer further comprises a mount on the second end for attaching a glass cutting head.

4. The glass tapping tool according to claim 3, wherein the glass cutting head is a dry cutting head.

5. The glass tapping tool according to claim 3, wherein the glass cutting head is a self-oiling cutting head.

6. The glass tapping tool according to claim 5, wherein the slidable hammer has a opening in the second end for holding a lubricant, and a tube in communications with the opening for providing lubricant to the self-oiling cutting head.

7. The glass cutting tool according to claim 3, wherein the glass cutting head is selected from the group of glass cutting heads for cutting window glass, stained glass, ceramic, Plexiglas™, plastic, safety glass, bulletproof glass, and mirrors.

8. The glass tapping tool according to claim 2, wherein the spring is selected from the group of elastic members consisting of a coil, a spring, and an elastic.

9. A glass cutting tool for breaking cut glass comprising:
   a hollow tube with a first end and a second end;
   a breaker cap fixed to the first end of the tube for tapping a piece of glass;
   a slidable hammer with a first end and a second end, slidably mounted inside the hollow tube;
   an elastic member for joining the breaker cap and the first end of the slidable hammer; and
   a glass cutting head coupled to the second end of the slidable hammer, wherein the glass cutting head when urged away by a user from the hollow tube produces a counteracting force due to the elastic member so that when the user releases the glass cutting head, the elastic member pulls the glass cutting head back against the hollow tube and the slidable hammer, along with the elastic member strikes the breaker cap so as to tap the piece of glass along a score-line that has been previously cut into the glass.

10. The glass cutting tool according to claim 9, wherein the glass cutting head is a dry cutting head.

11. The glass cutting tool according to claim 9, wherein the glass cutting head is a self-oiling cutting head.

12. The glass cutting tool according to claim 11, wherein the slidable hammer comprises reservoir for holding lubricant and a passage in communication with the reservoir so that lubricant in the reservoir can lubricate the self-oiling cutting head.

13. The glass cutting tool according to claim 9, further comprising:
   a safety wire connected between the breaker cap and the slidable hammer so as to keep the slidable hammer from pulling away from the breaker cap should the elastic member break.

14. The glass cutting tool according to claim 9, wherein the hollow tube contains a stop disposed within the tube near the second end of the tube and the slidable hammer further comprises a chamfer that engages the stop so as to limit the travel of the slidable hammer out of the hollow tube when the cutting head is urged away from the tube by a user.

15. The glass cutting tool according to claim 1, wherein the elastic member is selected from the group of elastic members consisting of a coil, a spring, and an elastic.

16. The glass tapping tool according to claim 9, wherein the glass cutting head is selected from the group of glass cutting heads for cutting window glass, stained glass, ceramic, Plexiglas™, plastic, safety glass, bulletproof glass, and mirrors.

* * * * *